A. SUNDH.
CURRENT CONTROLLING APPARATUS.
APPLICATION FILED JUNE 12, 1905.

994,345.

Patented June 6, 1911.

3 SHEETS—SHEET 1.

WITNESSES:
Charles M. Nissen
Walter C. Strang

INVENTOR
August Sundh
BY
Brown Darby & Hopkins
ATTORNEYS

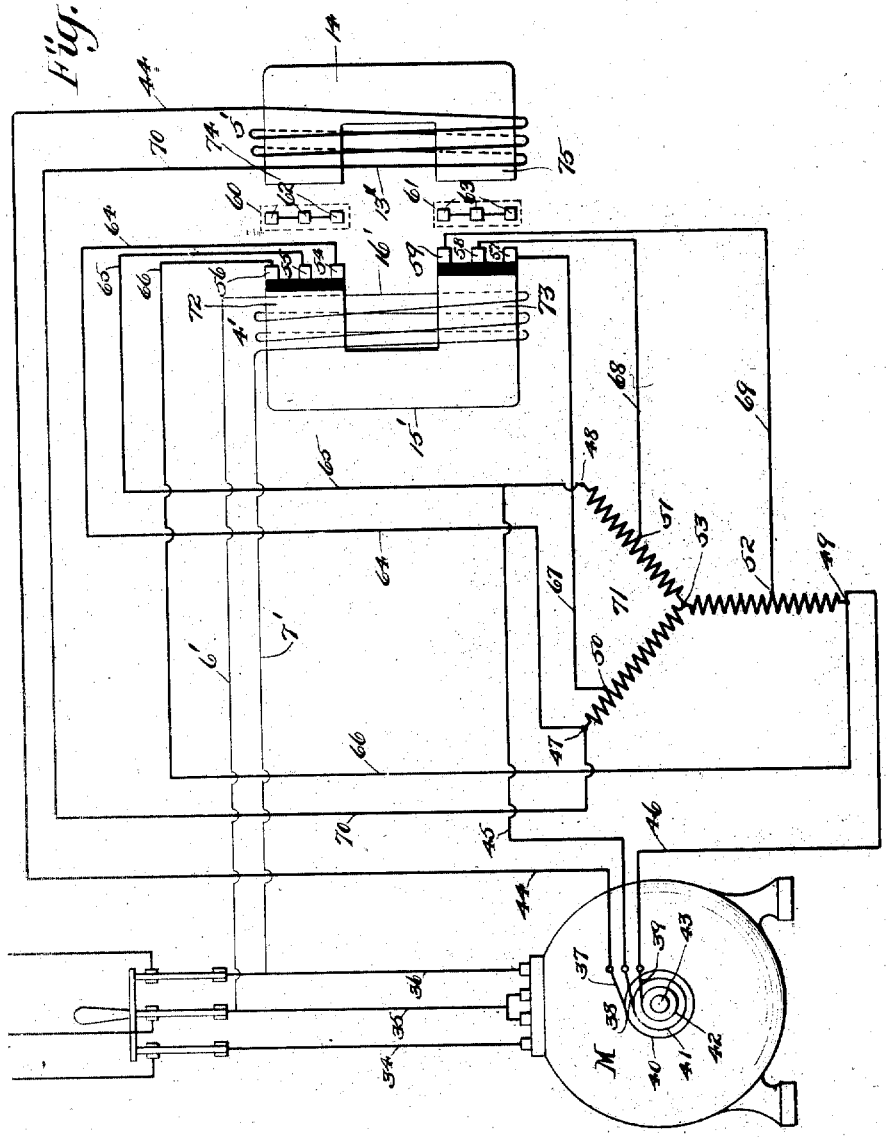

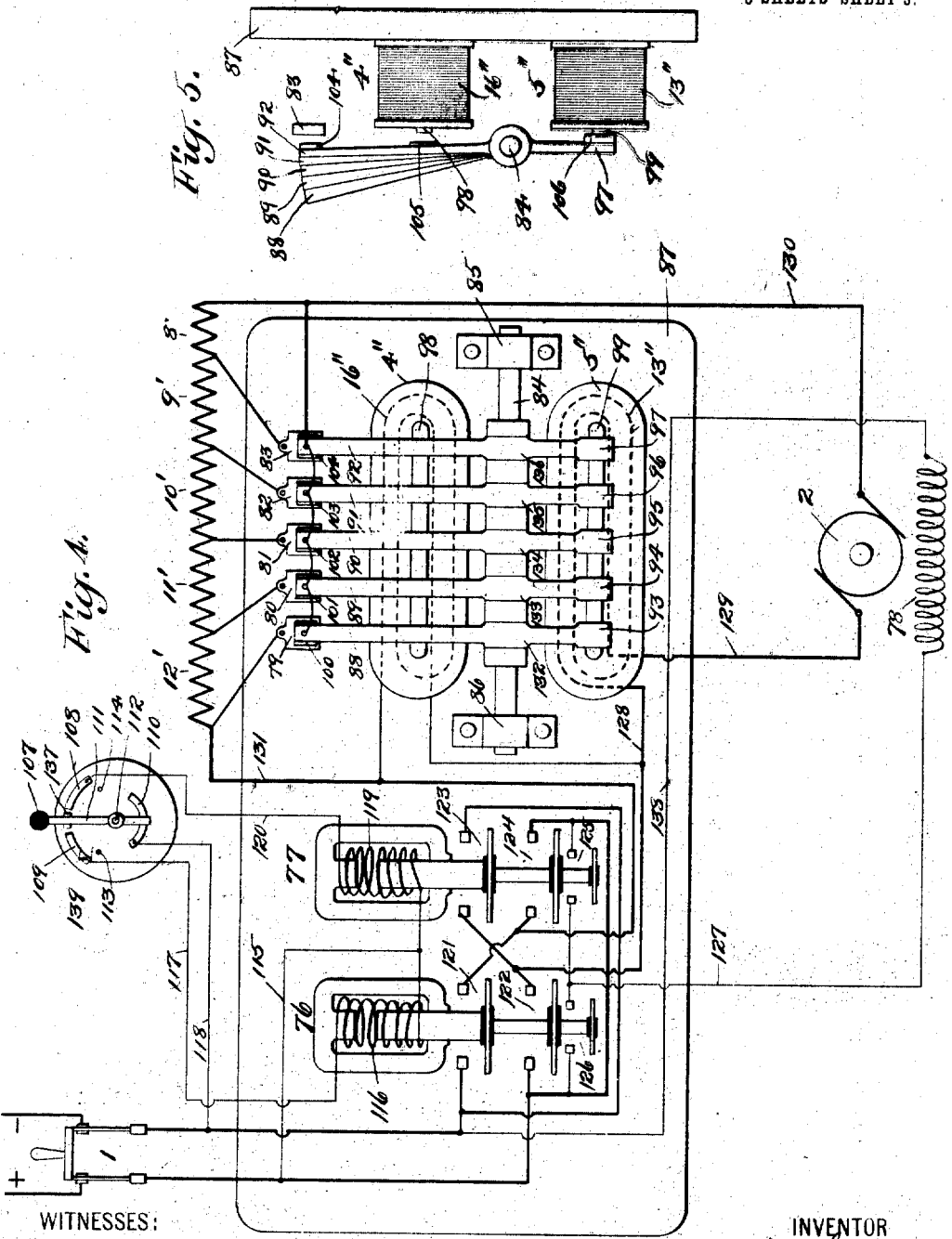

UNITED STATES PATENT OFFICE.

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

CURRENT-CONTROLLING APPARATUS.

994,345.   Specification of Letters Patent.   Patented June 6, 1911.

Application filed June 12, 1905. Serial No. 264,771.

*To all whom it may concern:*

Be it known that I, AUGUST SUNDH, a citizen of the United States, residing at Yonkers, in the county of Westchester and State of New York, have invented a new and useful Improvement in Current-Controlling Apparatus, of which the following is a specification.

My invention relates to current controlling apparatus and has for its object the provision of simple and efficient means for controlling electric motors.

Further objects will appear hereinafter, the novel combinations of elements being pointed out in the appended claims.

Figure 1:
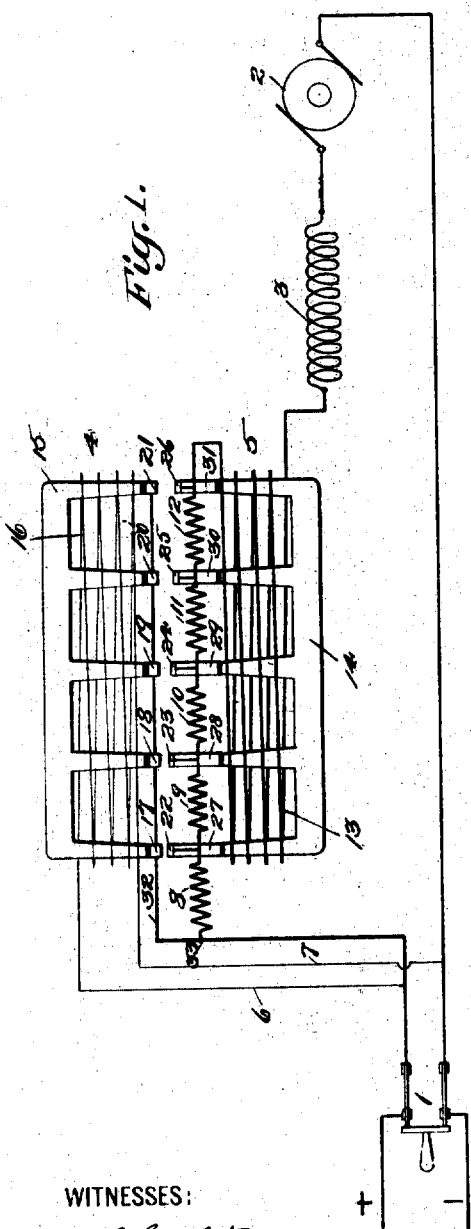
Figure 2:
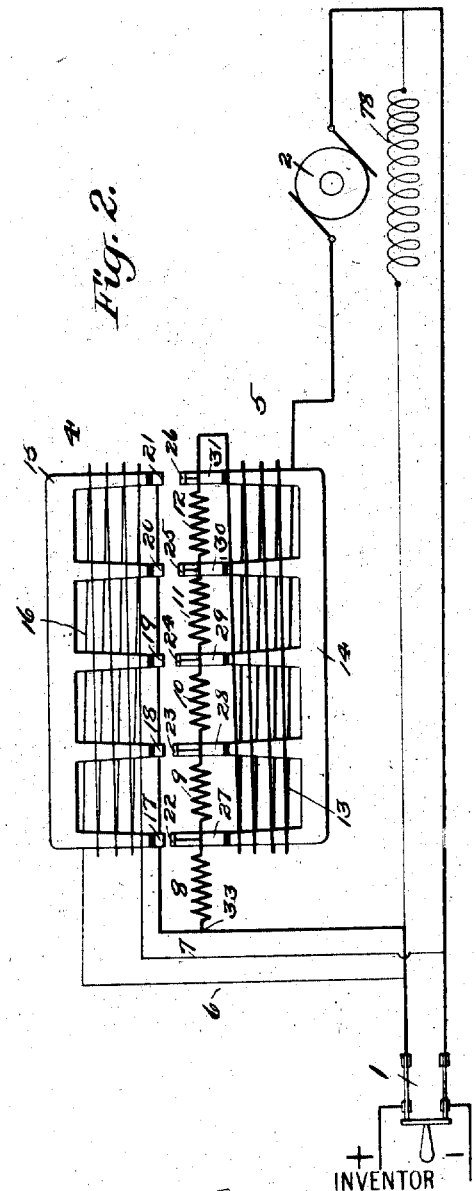

Referring to the drawings, Figure 1 represents diagrammatically an embodiment of my invention in which a series motor is connected to be automatically controlled; Fig. 2 is a similar view but illustrating a shunt motor in place of a series motor; Fig. 3 illustrates my device applied to the starting of an alternating current motor; Fig. 4 is an elevational view illustrating my invention, with certain modifications, in connection with automatic reversing switches controlled by a manual switch; and Fig. 5 is an end view of Fig. 4 to show certain details.

Like parts are designated by the same reference signs throughout the various views.

In Fig. 1 the main line switch 1 connects the + and — mains to a series motor comprising the armature 2 and field 3 in series with each other. The controlling apparatus for the motor comprises two opposing electro-magnets, one, designated by the reference number 4, being connected across the mains by means of the wires 6 and 7, and the other, 5, being connected in series with the motor. The winding 16 of opposing magnet 4 is of relatively small wire as compared with that of the series magnet 5. The motor armature may be termed the controlled partial circuit. There may be a plurality of poles extending from the frames 14 and 15 as shown in Fig. 1 or a single pole may be used as in Fig. 4.

The magnets 4 and 5 are placed opposite each other so that the action of one will be opposed by the action of the other. This is for the purpose of varying the combined resistances 8, 9, 10, 11 and 12. Insulated contacts 17, 18, 19, 20 and 21 are mounted on the ends of the poles of magnet 4 and these contacts are connected together by the wire 32 of low resistance which extends to the plus main. Between the respective poles of the magnets 4 and 5 I provide movable armatures 27, 28, 29, 30 and 31 normally held against the poles of magnet 5 by gravity or by other means although this is not essential as they may be left normally in an intermediate position if desired, but not against the contacts on the opposing magnet 4. Opposite the contacts 17, 18, 19, 20 and 21 and fixed to the armatures 27, 28, 29, 30 and 31 so as to move therewith are the additional contacts 22, 23, 24, 25 and 26. These additional contacts are connected to the resistances 8, 9, 10, 11 and 12 at the latter's junction points.

The operation is as follows: Assuming that the contacts of the shunt magnet 4 are disconnected from those on the armatures, let the main line switch 1 be closed to start the motor. The current must pass through the resistances 8, 9, 10, 11, 12 and winding 13 of series magnet 5 in series and thence through the series field 3 and armature 2 of the motor to the — main. Both the magnets 4 and 5 are at once energized but the ampere turns of the series magnet 5 are greater than that of the opposing magnet 5 when the main line switch is first closed. The armatures 27, 28, 29, 30 and 31 will therefore be held against the poles of magnet 5. But as the motor increases in speed and generates counter-electromotive force the current in the series circuit gradually diminishes while that through the winding 16 of magnet 4 remains the same, being connected across constant potential mains. It will be noticed that the distances between the fixed contacts and movable contacts vary from a minimum at the left to a maximum at the right. Now as the motor increases in speed and the current through the winding 13 of series magnet 5 diminishes the armatures 27, 28, 29, 30 and 31 are successively released and attracted by the magnet 4 to itself. This has the effect of successively short-circuiting the resistances 8, 9, 10, 11 and 12 and thus allowing the motor to gradually increase in speed to its maximum. The magnet 5 in this instance is shown retained in circuit with the motor, the winding 13 being made of low resistance in order to reduce the amount of power consumed in the magnet winding. With this arrangement, if the speed of the motor should diminish so that there would be a tendency for a dangerous current to flow, the magnet 5 would overcome the magnet 4 and reinsert the resistances.

It is well-known that when the direction of current through both the armature and field of a series motor is changed the armature will revolve in the same direction as before. It is therefore apparent that a direct current series motor can be operated by an alternating current, the direction of rotation not being changed by reversals of current. The construction shown in Fig. 1 is particularly adapted to electric railways and also to single phase alternating current.

In Fig. 2 I have shown a shunt motor with a shunt field 78 instead of a series motor as in Fig. 1, this arrangement being preferable in electric elevators, for example. Since the other parts and their functions are the same as in Fig. 1 no further description of Fig. 2 is necessary.

In Fig. 3 the principle of my invention is illustrated as embodied in apparatus for controlling the starting of a polyphase motor. As before I have arranged two magnets opposite each other so that the action of one shall be opposed by that of the other. The winding 4' of one of these magnets is connected by means of the wires 6', 7' across two of the main lines 34, 35, 36. In this instance I have connected the wires 6', 7' to the lines 35, 36 respectively. 1' designates a main line switch for closing the circuit to the three-wire two-phase motor M. This motor may be a three-phase motor if desired, however, or any other type may be used, that shown being merely by way of illustration. The rotor windings of the motor are connected to slip rings 40, 41, 42 on which bear the brushes 37, 38 and 39 respectively. These brushes are connected by means of the wires 44, 45 and 46 to the terminals 47, 48 and 49, respectively, of a variable resistance of a form corresponding to the windings of the rotor. The terminals 47, 48 and 49 are connected also to insulated contacts 54, 55 and 56, by means of the wires 64, 65 and 66, respectively. These contacts are fixed to the pole 72 of the magnet 4'. A similar set of insulated contacts 57, 58 and 59 are mounted on the other pole 73 of magnet 4' and connected, respectively, to the taps 50, 51 and 52 of the resistance 71. For the sake of clearness I have shown only one tap in each arm of the resistance 71 but more may be made when a finer regulation is desired, in which case the poles and sets of contacts on magnet 4' will be correspondingly increased. Opposite the magnet 4' is the magnet 5' having its winding 13' connected between the brush 37 and terminal 47 through the wires 44 and 70, and having its poles 74 and 75 in juxtaposition to the poles 72 and 73, respectively, of the magnet 4'. Arranged normally in an intermediate position, are sets of contacts 62 and 63 mounted on armatures 60 and 61, the contacts in each set being electrically connected together. These sets of contacts are adapted to short-circuit the fixed contacts on the magnet 4'.

The operation of the construction shown in Fig. 3 will now be described.

The motor being of the induction type the rotor may be treated as the secondary of a transformer, and therefore it is seen that the winding 13' is in series with one of the phases of the secondary, the series extension of the rotor in this case being from brush 37, through wire 44, winding 13', wire 70, terminal 47 through one arm of resistance 71 to the zero point 53. When the main line switch 1' is closed to start the motor, maximum current tends to flow in the secondary or rotor but this is limited by the resistance 71. The potential in the secondary being a maximum at starting, the magnet 5' will be energized to its fullest extent by a single phase current. At the same time the magnet 4' is energized by a single-phase current direct from the main lines 35 and 36 but this current is substantially constant. The magnets are so wound that the armature 60 will be drawn toward the pole 74 and the armature 61 toward the pole 75 as soon as the switch 1' is closed and current flows, and the magnet core is so constructed that the pole 75 is nearer to pole 73 than pole 74 is to pole 72. After the motor starts and increases in speed the voltage in the secondary gradually diminishes. This causes the current in the winding 13' to gradually decrease to a predetermined value when the strength of magnet pole 73 becomes greater than that of pole 75 and the armature 61 is drawn toward the left whereupon the contacts 57, 58 and 59 will be electrically connected by the contacts 63 and thus short-circuit part of the resistance 71. This allows the rotor to increase in speed until it reaches another predetermined value when the pole 72 overcomes the pole 74 and the armature 60 is drawn toward the left to cause the movable contacts 62 to connect the fixed contacts 54, 55 and 56 and short-circuit the remainder of the resistance 71. The motor can now attain its maximum speed, the armatures 60 and 61 being held adjacent the poles of shunt magnet 4'.

In Fig. 4 I have shown a modification of the details of my apparatus and illustrated the same mounted on a suitable base 87 of insulation and in connection with the reversing switches 76 and 77. As thus shown this construction is particularly applicable to electric elevators, the manual controlling switch 139 being placed in the car and the motor-armature shaft connected to the hoisting mechanism, though, of course, it may be used in other relations. Fixed to the standards 85 and 86 on the board 87 is the shaft 84 on which are pivoted the double-armed levers 132, 133, 134, 135 and 136 in front of the magnets 4″ and 5″. These magnets have only one core each, the exposed poles being designated 98 and 99, which extend sufficiently in length to be able to act on all of the armatures connected to the double-armed levers just opposite the same. Fixed to the upper ends of the arms 88, 89, 90, 91 and 92 are contacts 100, 101, 102, 103, 104 which are adapted to successively engage the fixed contacts 79, 80, 81, 82 and 83, respectively. These fixed contacts are connected to a resistance so as to divide up the same into sections 8′, 9′, 10′, 11′ and 12′. The lower arms 93, 94, 95, 96 and 97 are each provided with armatures one of which is shown at 106 in Fig. 5. These armatures are normally held by gravity against the pole 99 of the series magnet 5″. As shown in Fig. 5, furthermore, the upper armatures, one of which 105 is shown, are arranged at different distances from the pole 98 of magnet 4″ so that as magnet 5″ decreases in strength the armatures will be attracted by magnet 4″ successively in order to effect a gradual or step-by-step cutting out of the resistances 8′, 9′, 10′, 11′ and 12′.

The operation of the apparatus shown in Fig. 4 will now be set forth. A detailed description of the reversing and controlling switches is not given as they *per se* form no part of my invention.

Assuming the main line switch 1 to be closed, let the lever 111, pivoted at 112, be moved toward the right by means of the handle 107 until the contact 137 bears on the fixed contact 108. A circuit may now be traced from the plus main, to and through wire 115, solenoid 119 of reversing switch 77, wire 120, contacts 108 and 137, lever 111, contact 110, wire 118, to the negative main. The switches 123, 124 and 125 will thereupon be closed. The switch 125 connects the shunt field 78 directly across the constant potential mains through the wires 127 and 138. The switches 123 and 124 close the remaining circuits, that through the motor-armature being traced from the positive main to switch 124 and by wire 131 through the resistances 12′, 11′, 10′, 9′ and 8′, wire 130, armature 2, wire 129, winding 13″ of magnet 5″, and switch 123 to the negative main. The magnet winding 16″ is at the same time connected across the main line from switch 124 to switch 123 and the magnet 4″ is therefore kept at constant strength. As the motor increases in speed the magnet 5″ decreases in strength and the magnet 4″ overcomes its influence on the armatures adjacent the magnet poles so that the starting resistances are short-circuited. The resistance 8′ will be first short-circuited since the armature of lever 92 is the one nearest the pole 98. The resistance 9′ will be next short-circuited, and so on until all the resistances are cut out so the motor can run up to maximum speed. Upon moving the handle 107 to central position the reversing switch 77 will return to its normal position and the lower arms of the double-armed levers will automatically drop back to their normal positions thus inserting the starting resistances. Upon moving the handle 107 to the left the reversing switch 76 will be operated and current sent through the motor armature in the opposite direction but through the field in the same direction therefore reversing the direction of rotation of said armature.

It should be noted that in Figs. 1, 2 and 3 the operation is entirely automatic after the closing of the main line switch. The advantage of this is that if the main line current should be turned off and then on again the motor would not be injured for just as soon as the magnets are deënergized the parts will assume their normal positions and the starting resistances inserted in series with the motor-armature. The same is true in regard to Fig. 4 after both the main line switch and the manual switch have been operated.

Having thus fully described my invention and without limiting myself to any of the details of construction or arrangement of parts, what I claim and desire to have protected by Letters Patent of the United States is:

1. The combination with a motor, of an electro-magnet in series with said motor, a plurality of armatures, a plurality of contacts carried by said armatures respectively, a plurality of fixed contacts, a sectional resistance connected to said fixed contacts and in series with said electro-magnet, and an additional electro-magnet of lesser strength at starting than said first-named electro-magnet and connected in shunt to the motor, said additional electro-magnet being in opposition to said first-named electro-magnet to successively operate said armatures and armature contacts to gradually short-circuit said resistance as the motor increases in speed.

2. The combination with a motor, of an electro-magnet, an additional electro-magnet arranged in opposition to said first-named electro-magnet and mechanically separate therefrom, a plurality of armatures for each of said electro-magnets, pivoted levers carrying said armatures, and means controlled by said levers for varying the motor armature current as the motor increases in speed.

3. The combination with a motor, of starting resistance therefor, a plurality of independently movable levers, a single means for pivotally supporting the said levers, electro-magnets of different strengths for acting on said levers to successively change their positions from normal, and means operated by such successive actuation for varying said resistance.

4. The combination with a motor, of starting resistance therefor, an electro-magnet of substantially constant strength, an additional electro-magnet in series with the motor armature, each of said electro-magnets having an elongated core, the cores being in substantially parallel planes, double-armed levers pivotally and independently movable in front of said electro-magnets, two armatures on each lever, the armatures for said series magnet being normally in engagement with the elongated pole thereof and the armatures for said first-named electro-magnet being arranged at different distances from the pole thereof, and means co-acting with said first-named electro-magnet for varying said resistance.

In testimony whereof, I have signed my name to this specification in the presence of two subscribing witnesses.

AUGUST SUNDH.

Witnesses:
 FRANK T. BROWN,
 CHARLES M. NISSEN.